May 15, 1928.  1,670,219
A. R. SMITH
FAUCET CONNECTION
Filed March 7, 1925
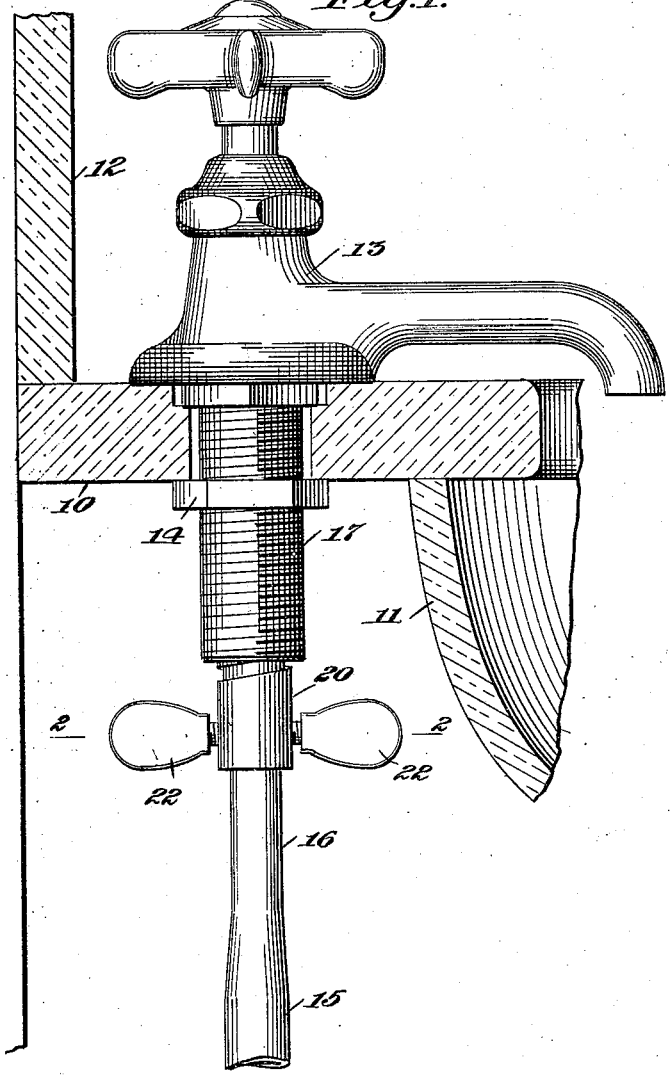
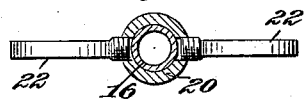
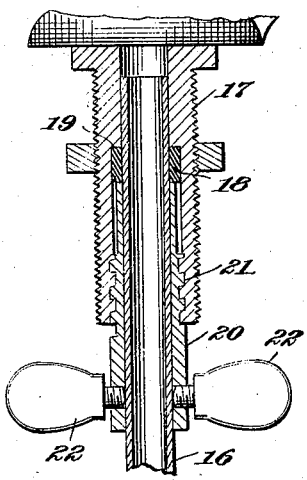
Inventor:
Albert R. Smith,
Att'y.

Patented May 15, 1928.

1,670,219

UNITED STATES PATENT OFFICE.

ALBERT R. SMITH, OF JESUP, GEORGIA.

FAUCET CONNECTION.

Application filed March 7, 1925. Serial No. 13,831.

My said invention relates to a faucet connection and it is an object thereof to provide means for attachment of a water pipe to a faucet which shall be easy and convenient of application and which provides for a very considerable saving in the time of the plumber as compared with devices heretofore in use. It is well-known that wash bowls, bathtubs and like fixtures are commonly located in places inconvenient of access, such as the corners of rooms or at least against the wall with the faucets near the wall and often at the rear corner close to the right angle between two walls. In addition to this many such bowls are provided with depending skirts to improve their appearance. Under the best conditions it is difficult to apply a wrench to the nut or nuts underneath the bowl, while under some conditions it is almost impossible to do so and it becomes a matter of very great difficulty to make the connection in a proper manner so as to insure that it shall be water-tight and shall not flood the room in which the faucet is situated, as well as rooms beneath it, when the water is turned on. It is a matter of common experience for plumbers to work two or three hours in making one such connection whereas by my invention it becomes a matter of a few moments with consequent saving in time and expense.

Referring to the accompanying drawings, which are made a part hereof and on which similar reference characters indicate similar parts, Figure 1 is a side elevation of my invention as applied to a bowl shown in section, Figure 2, a transverse section on line 2—2 of Fig. 1, and Figure 3, a vertical section at right-angles to Fig. 2.

In the drawings reference character 10 indicates a ledge forming part of a structure including a bowl 11 and a panel 12 to prevent splashing of water against the wall. A faucet 13 of any desirable or conventional character has a downward extension through an opening in the ledge and is secured in place by means of a hexagonal nut 14. A pipe 15 is provided at its upper end with a reduced portion 16 having a sliding fit in the upper end of the extension 17 of the faucet. At its lower end the bore of the extension is enlarged and a packing 18 rests against a shoulder at 19, which shoulder is ground to provide a smooth fit and prevent injury to the packing. A packing nut 20 has a smooth plane surface at one end engaging the packing to force it firmly against the shoulder 19 and close the space between the pipe and the extension 17, and the packing nut has a steep coarse thread at 21 fitting in a similar thread in the bore of the faucet, both said threads extending only for a short distance and the nut being reduced and having a smooth outer periphery above the thread so as to enable it to enter the lower end of the bore readily and without interference with the thread on the bore. If desired segmental or mutilated threads may be used instead of the threads just described.

For bringing the nut into position to compress the packing I have provided it with removable wings 22, each of which has a threaded stem for engagement with a threaded aperture in the wall of the nut. Preferably such apertures extend through said wall though not necessarily so.

It will be seen from the foregoing that the pipe 15 need not be cut exactly to the proper length but may extend upward into the reduced portion of the bore of the extension 17 and terminate at any point in such reducced portion above the packing 18. Even if the reduced neck 16 be slightly out of alinement with the extension 17 the packing nut 20 can be introduced into its proper place because of the relatively small size and smooth exterior of its upper wall. When the nut is moved upward the threads will take hold quickly because of their coarseness and the nut may be forced to its final position quickly because of the steep pitch of the threads.

The wings on the nut enable the plumber to manipulate the same with his hands or with one hand if necessary. If the space is so small and confined as not to provide sufficient space for the nut with both wings thereon one wing can be removed and pressure exerted on the other until it is close to the wall or other obstruction whereupon it may be removed and threaded into the other aperture. The nut can then be turned through a further arc and thus quickly be brought to position. It will be understood that the nut 14 also offers difficulties but no serious harm is done if this nut is somewhat loose whereas if nut 20 is loose the packing will not be sufficiently compressed and water will spurt out beneath the bowl as soon as it is turned on in the water system of the building. The wings may be removed after the nut is brought to place if this is considered desirable for any reason, as to prevent tampering by children or mischievous persons, or the wings can be screwed in so far as to bind against the extension 16 and serve as a lock for the nut 20, if desired.

It will be obvious to those skilled in the art that various changes may be made in my device and that it may be used in other places, as for example on ball cocks of toilet bowls, without departing from the spirit of the invention and therefore I do not limit myself to what is shown in the drawings and described in the specification but only as indicated in the appended claims.

Having thus fully described my said invention, what I claim as new and desire to secure by Letters Patent, is:

1. A faucet connection between the downward extension of a faucet and the pipe beneath it comprising a packing resting against an internal shoulder in such extension, a nut bearing against said packing, and wings having shanks threaded in said nut each shank being of a length sufficient to project through the nut and engage the pipe, substantially as set forth.

2. A faucet connection comprising a faucet body having a cylindrically bored depending extension interiorly enlarged adjacent its outer end and forming an internal shoulder between said bore and said enlargement, the extremity of said enlargement being provided with internal screw threads of relatively steep pitch, a pipe slidably mounted in the bore of said faucet body, a packing about said pipe adjacent said internal shoulder, a packing nut about said pipe having external screw threads for cooperation with the threads in the enlarged portion of the extension said packing nut having a smooth external surface adjacent its extremity and adapted to be forced endwise against said packing to compress the same against the internal shoulder and the pipe, the outer end of said packing nut having a plurality of threaded openings therethrough, and wings having threaded shanks for engagement with said openings all of a length sufficient to project therethrough and engage said pipe, substantially as set forth.

3. A faucet connection comprising a faucet body having a cylindrically bored depending extension interiorly enlarged adjacent its outer end and forming an internal shoulder between the bore and the enlarged portion, said enlarged portion being provided with internal screw threads, a pipe slidably mounted in the bore of the faucet body, a packing about the pipe adjacent said internal shoulder, a packing nut about the pipe having screw threads for cooperation with the threads in the enlarged portion of the extension, said packing nut being adapted to be forced endwise to compress the packing against the internal shoulder and pipe, said packing nut having one or more threaded openings therethrough, and wings having threaded shanks for engagement with said threaded openings and of a length sufficient to project therethrough and engage said pipe, substantially as set forth.

In witness whereof, I have hereunto set my hand at Washington, District of Columbia, this twenty-seventh day of February, A. D. nineteen hundred and twenty-five.

ALBERT R. SMITH.